(12) United States Patent
Andrews et al.

(10) Patent No.: US 6,773,622 B1
(45) Date of Patent: Aug. 10, 2004

(54) ANTI-ICING FORMULATIONS

(76) Inventors: Greg R. Andrews, 70 Home Ave., Sec. Floor, Middletown, CT (US) 06457; Robert S. Mendenhall, 9 Brainard Ave., Middletown, CT (US) 06457

( * ) Notice: Subject to any disclaimer, the term of this patent is extended or adjusted under 35 U.S.C. 154(b) by 696 days.

(21) Appl. No.: 09/661,702

(22) Filed: Sep. 14, 2000

Related U.S. Application Data

(60) Provisional application No. 60/154,706, filed on Sep. 18, 1999.

(51) Int. Cl.$^7$ .................................................. C09K 3/18
(52) U.S. Cl. .............................. 252/70; 252/73; 116/13
(58) Field of Search ........................ 252/70, 73; 116/13

(56) References Cited

U.S. PATENT DOCUMENTS

| | | | | |
|---|---|---|---|---|
| 4,508,635 A | * | 4/1985 | Clarke | ................... 252/174.23 |
| 4,954,279 A | * | 9/1990 | Ma et al. | ....................... 252/70 |
| 5,389,276 A | | 2/1995 | Coffey et al. | |
| 5,772,912 A | * | 6/1998 | Lockyer et al. | ................ 252/70 |
| 5,863,973 A | * | 1/1999 | Carder et al. | ................ 524/388 |

* cited by examiner

*Primary Examiner*—Charles Boyer
*Assistant Examiner*—D G Hamlin
(74) *Attorney, Agent, or Firm*—Myers & Kaplan, LLC; Barry E. Kaplan

(57) ABSTRACT

Formulations for anti-icing compositions are of two basic types. The first basic formulation describes alcohol/polyol-based aqueous fluids thickened by the combination of an acrylic emulsion and a water-swellable layered clay mineral, with optional addition of a surfactant combination comprised of a first surfactant with an HLB$\leq$3 coupled with a second surfactant with an HLB 19, and further optional addition of a water-activated polymer and other components. The second basic formulation describes a polyol-based aqueous solution of polyvinyl alcohol with optional thickeners.

11 Claims, No Drawings

ANTI-ICING FORMULATIONS

RELATED APPLICATIONS

This non-provisional application claims the benefit of Provisional Application Serial No. 60/154,706, filed on Sep. 18, 1999.

TECHNICAL FIELD

The present invention relates generally to anti-icing formulations; and, more specifically, to anti-icing and de-icing formulations produced from alcohol/polyol-based aqueous fluids, thickened by the combination of an acrylic emulsion and a water-swellable layered clay mineral. Optional formulations include the addition of a surfactant combination comprised of a first surfactant with an hydrophilic/lipophilic balance ("HLB") $\leq 3$, coupled with a second surfactant with an HLB 19, and include the further optional addition of a water-activated polymer and other components. A second basic formulation describes a polyol-based aqueous solution of polyvinyl alcohol with optional thickeners.

BACKGROUND OF THE INVENTION

The problem of ice formation on surfaces is well known, and is addressed extensively in the prior art. There is still a need, however, for deicing/anti-icing compositions which offer enhanced resistance to rain wash-off. Furthermore, there exists a need for effective deicing/anti-icing compositions which may be applied using simple light-duty hand-held sprayers.

Accordingly, it is an object of the present invention to provide a first form of anti-icing compositions which are easily removable from surfaces to which they are applied, and contain no polyvinyl alcohol, and to provide a second form that will set-up to form a rubber-like gel within several hours after mixing.

It is another object of the present invention to provide anti-icing compositions principally comprising an aqueous solution of monohydroxy and/or polyhydroxy alcohols, thickened with a combination of an acrylic emulsion polymer and a water-swellable, colloid-forming clay mineral.

It is still another object of the present invention to provide anti-icing compositions compatible with optional ingredients such as polyols, surfactants, pH-modifiers, friction-reducing agents, corrosion inhibiting agents, anti-oxidants, UV inhibitors, biocides, dyes, foam control agents, odor-modification agents, stabilizers, and the like.

It is yet another object of the present invention to provide anti-icing compositions that utilize non-toxic chemicals as freezing point depressants.

It is yet still another object of the present invention to provide anti-icing compositions having viscosity that may be adjusted for application of the composition through a variety of means.

BRIEF SUMMARY OF THE INVENTION

The present invention provides substantial improvement to the art for a variety of applications. Formulations are described for compositions which may be applied using light-duty sprayers, yet still allow for higher viscosities, and, thereby, greater resistance to rain wash-off, than analogous prior-art formulations. Formulations are also described which provide enhanced resistance to water incursion. Formulations are further described for compositions providing such an extreme level of resistance to wash-off that they are only suitable for applications where easy removal of the composition is not an issue.

Accordingly, anti-icing compositions are disclosed comprising an aqueous solution of monohydroxy and/or polyhydroxy alcohols, thickened with a combination of an acrylic emulsion polymer and a water-swellable, colloid-forming clay mineral. Optional additions include glycerine, and added surfactant combinations comprised of a first surfactant with an hydrophilic/lipophilic balance $\leq 3$ coupled with a second surfactant with an HLB 19. An example of such surfactant combination is a block copolymer of ethylene-oxide and propylene-oxide.

Further optional additions may include Teflon powder, graphite, pH-modifiers, corrosion inhibiting agents, anti-oxidants, UV inhibitors, biocides, dyes, foam control agents, odor-modification agents, stabilizers, and the like. Advantageously, the preferred formulations of the present invention utilize non-toxic chemicals as freezing point depressants.

DETAILED DESCRIPTION OF THE PREFERRED EMBODIMENT

In describing the preferred and alternate embodiments of the present invention, specific terminology is employed for the sake of clarity. The invention, however, is not intended to be limited to the specific terminology so selected, and it is to be understood that each specific element includes all technical equivalents that operate in a similar manner to accomplish similar functions.

The present invention consists of formulations for anti-icing fluids. These fluids also have utility for deicing applications. The present formulations are of two basic types, which are most simply distinguished by the presence or lack of polyvinyl alcohol.

Type I Formulations:

The formulations of the first basic type are designed to be easily removable from surfaces to which they are applied, and contain no polyvinyl alcohol. These formulations are comprised of combinations of the following components:

A. Freezing point depressant: This component will typically comprise between 20 to 80 weight percent of the total composition. The following are preferred:

a) One, two, or three carbon alcohols (i.e., methyl, ethyl, and propyl alcohols). These alcohols provide economy, low viscosity, rapid evaporation, and are quite flammable.

b) Two or three carbon glycols (i.e., ethylene glycol or propylene glycol). These diols are viscous, odorless, slow evaporating, and non-flammable.

c) Glycerol (1,2,3-propanetriol). Glycerol (Glycerine) is very viscous, odorless, extremely slow evaporating, and non-flammable. (For maximum viscosity and water resistance, these compositions should contain at least approximately 5% by weight glycerine).

d) Any combination of the above. The above components blend easily to yield compositions with a combination of the above-mentioned properties.

B. Water: This component will typically comprise between 20 to 80 weight percent of the total composition. The water does not have to be distilled or purified, although hard water may require pre-treatment or the addition of a sequestrant.

C. Acrylic-based emulsion polymer or copolymer: This component will typically comprise between 0.1 to 15 weight percent of the total composition. Most preferred are associative, hydrophobically modified polymer emulsions.

D. Colloid-forming (water swellable) layered clay mineral: This component will typically comprise between 0.05 to 5 weight percent, and most typically between 0.1 to 2 weight percent of the total composition. Preferred are natural or synthetic hectorites, montmorillonites and bentonites, and of these, purified or synthetic hectorites are especially preferred.

E. Nonionic surfactant with an HLB in the range of 1 to 3: This component is optional, and will typically comprise between 0.1 to 3 weight percent, and most typically between 0.5 to 2.0 weight percent of the total composition.

F. Nonionic surfactant with an HLB of 19 or above: This component is optional, and will typically comprise between 0.01 to 1.0 weight percent, and most typically between 0.05 to 0.5 weight percent of the total composition.

G. Polymeric water-activated thickening agent: This component is optional, and will typically comprise between 0.01 to 10.0 weight percent, and most typically between 0.1 to 5.0 weight percent of the total composition. Preferred are polysaccharide thickeners, natural gum thickeners, marine algae colloids, and cellulose ether thickeners. Most preferred is a polysaccharide known generically as Xanthan Gum.

H. pH adjusting agent: This component will typically comprise less than 0.5 weight percent of the total composition, and is, in any case, only required in an amount sufficient to adjust the pH upward to the range between 6 to 12, most preferably to between 7.5 to 10. Preferred are alkaline metal hydroxides and organic amine bases, although it may be advisable to avoid the use of tertiary amines as these can possibly interfere with the gel structure of these formulations.

I. Corrosion Inhibitors: These components are optional, and will typically comprise less than 1 weight percent of the total composition. Corrosion inhibitors useful as ingredients in alcohol/polyol based aqueous solutions are well known in the art, and selection may be made based upon the type of surfaces with which the present compositions are likely to come into contact, and how long and under what conditions they are likely to remain on that surface.

J. Powder lubricant: This component is optional, and is only used in compositions which are designed for applications such as locks or hinges, where it may be useful to supplement the anti-icing function with one of lubrication. Preferred are graphite or Teflon powders, and the amounts will typically comprise between 0.1 to 10 weight percent of the total composition.

K. Miscellaneous additives: The composition may also contain various other functional ingredients such as antioxidants, UV inhibitors, biocides, dyes, foam control agents, odor-modification agents, stabilizers and the like. Each of these components will typically comprise less than 1.0 weight percent of the total composition.

Examples of Type I Formulations:

Some examples of compositions produced by the aforementioned first basic type formulations are as follows, with the ingredients listed in approximate order of addition:

i. Slow-evaporating, non-toxic, viscous, thixotropic anti-icing fluid for application by trigger-type or other light-duty sprayers.

| | |
|---|---|
| 40 wt. % | Water |
| 0.25 wt. % | LAPONITE ® (synthetic hectorite clay: Laporte Industries, Ltd.) |
| 0.75 wt. % | ALCOGUM ® SL-70 (acrylic emulsion terpolymer: ALCO Chemical) |
| 0.1 wt. % | PLURONIC ® F108 (nonionic surfactant: BASF) |
| 23 wt. % | Glycerine |
| 20 wt. % | Propylene glycol |
| ≈0.1 wt. % | AMP-95 (Aminomethyl propanol: Angus Chemical Co.) |
| 15 wt. % | Isopropyl Alcohol |
| 0.5 wt. % | PLURONIC ® 31R1 (nonionic surfactant: BASF) |
| 0.4 wt. % | Orange Oil 5 Fold (Frutarom-Meer Corporation) | ii. Viscous, thixotropic anti-icing fluid for use in automobile windshield washer reservoirs:

| | |
|---|---|
| 48.5 wt. % | Water |
| 0.25 wt. % | LAPONITE ® (synthetic hectorite clay: Laporte Industries, Ltd.) |
| 0.5 wt. % | ALCOGUM ® SL-70 (acrylic emulsion terpolymer: ALCO Chemical) Note: This ingredient is optional for windshield washer reservoir fluid. |
| 0.05 wt. % | PLURONIC ® F108 (nonionic surfactant: BASF) |
| 15 wt. % | Ethylene glycol (substitute propylene glycol to produce a non-toxic product) |
| ≈0.1 wt. % | AMP-95 (Aminomethyl propanol: Angus Chemical Co.) |
| 35 wt. % | Methanol (substitute isopropyl alcohol to produce a non-toxic product) |
| 0.5 wt. % | PLURONIC ® 31R1 (nonionic surfactant: BASF) |
| 0.3 wt. % | Orange Oil 5 Fold (Frutarom-Meer Corporation) (Use when isopropyl alcohol is an ingredient.) | iii. Highly water-resistant, low-evaporation, non-toxic, anti-icing gels for application by hand-held spreaders or heavy-duty sprayers:

| | |
|---|---|
| 36 wt. % | Water |
| 0.5 wt. % | LAPONITE ® (synthetic hectorite clay: Laporte Industries, Ltd.) |
| 10 wt. % | ALCOGUM ® SL-70 (acrylic emulsion terpolymer: ALCO Chemical) |
| 0.12 wt. % | PLURONIC ® F108 (nonionic surfactant: BASF) |
| 10 wt. % | Glycerine |
| 42 wt. % | Propylene glycol |
| 0.4 wt. % | KELZAN ® (xanthan gum: Kelco Industrial Biopolymers) |
| 1.2 wt. % | PLURONIC ® 31R1 (nonionic surfactant: BASF) |
| ≈0.2 wt. % | AMP-95 (Aminomethyl propanol: Angus Chemical Co.) | iv. Low-evaporation, non-toxic, highly viscous anti-icing gel with lubricant; for application by injection into all types of locks:

| | |
|---|---|
| 35 wt. % | Water |
| 1.0 wt. % | LAPONITE ® (synthetic hectorite clay: Laporte Industries, Ltd.) |
| 2.0 wt. % | ALCOGUM ® SL-70 (acrylic emulsion terpolymer: ALCO Chemical) |
| 0.15 wt. % | PLURONIC ® F108 (nonionic surfactant: BASF) |
| 40.0 wt. % | Glycerine |
| 20 wt. % | Propylene glycol |
| 0.5 wt. % | Zonyl ® MP 1000 (PTFE powder: DuPont) |
| 0.5 wt. % | KELZAN ® (xanthan gum: Kelco Industrial Biopolymers) |
| 0.7 wt. % | PLURONIC ® 31R1 (nonionic surfactant: BASF) |
| ≈0.2 wt. % | AMP-95 (Aminomethyl propanol: Angus Chemical Co.) |

Type II Formulations:

The formulations of the second basic type contain polyvinyl alcohol, and are designed to be extremely water resistant. These formulations are comprised of the following components:

A. Freezing point depressant: This component will typically comprise between 30 to 70 weight percent of the total composition. The following are preferred:

a) Two or three carbon glycols.

b) Glycerol (Glycerine, 1,2,3-propanetriol).

c) A combination of the above.

B. Water: This component will typically comprise between 30 to 70 weight percent of the total composition. The water does not have to be distilled or purified, although hard water may require pre-treatment or the addition of a sequestrant.

C. Polyvinyl alcohol: This component will typically comprise between 2 to 15 weight percent, and most typically between 6 to 10 weight percent, of the total composition. Fully-hydrolyzed, gel-resistant grades are most preferred.

D. Acrylic-based emulsion polymer or copolymer, or a crosslinked homopolymers or copolymers of acrylic acid: This component is optional, and will typically comprise between 0.1 to 10 weight percent of the total composition. Most preferred are hydrophobically-modified compounds.

E. Polymeric water-activated thickening agent: This component is optional, and will typically comprise between 0.1 and 10.0 weight percent of the total composition. Preferred are polysaccharide thickeners, natural gum thickeners, marine algae colloids, and cellulose ether thickeners. Most preferred is a polysaccharide known generically as Xanthan Gum.

F. Hydrogen peroxide: This component is optional, and will typically comprise between 0.02 and 1.5 weight percent of the total composition. This ingredient serves to lower the viscosity of polyvinyl alcohol solutions.

G. pH adjusting agent: This component will typically comprise less than 0.5 weight percent of the total composition, and is, in any case, only required in an amount sufficient to adjust the pH upward to the range between 7 and 12, most preferably to between 7.5 and 10. Strong bases, such as alkaline metal hydroxides can cause damage to the polyvinyl alcohol. Preferred are organic amine bases or ammonium hydroxide.

H. Corrosion inhibitors: These components are optional, and will typically comprise less than 1 weight percent of the total composition. Corrosion inhibitors useful for use in polyol based aqueous solutions are well known in the art, and selection may be made based upon the type of surfaces which the present compositions are likely to come in contact with, and how long and under what conditions they are likely to remain on that surface.

I. Miscellaneous additives: The composition may also contain various other functional ingredients such as surfactants, anti-foaming agent, anti-oxidants, UV inhibitors, biocides, dyes, odor-modification agents, stabilizers and the like. Each of these components will typically comprise less than 1.0 weight percent of the total composition.

Examples of Type II Formulations:

Compositions produced by the aforementioned second basic formulation will set-up to form a rubber-like gel within several hours after mixing. Typically, therefore, these compositions will be made in two or more parts, which are then mixed together prior to use. An example is shown below of a three part formulation. Parts A and B are volumetrically approximately equal parts, with the ingredients listed in order of addition:

| PART A: | |
|---|---|
| 82 wt. % | Water |
| 0.5 wt. % | Hydrogen peroxide |
| 0.07 wt. % | TRITON ® X-100 (gel-inhibiting surfactant: Union Carbide) |
| 17 wt. % | ELVANOL ® 85-82 (polyvinyl alcohol: Dupont) |
| ≈0.2 wt. % | Triethanolamine (sufficient to produce a pH of about 7–10 for the combined parts) |

| PART B: | |
|---|---|
| 99.3 wt. % | Glycerine |
| 0.5 wt. % | Carbopol ® ETD 2623 (polyacrylic acid carbomer: B.F. Goodrich) |
| ≈0.2 wt. % | DREWPLUS ® L-474 (foam control agent: Drew Industrial Div., Ashland Chemical) |
| ≈0.02 wt. % | Any color dye to indicate whether Parts "A" and "B" are fully mixed |

| PART C: | |
|---|---|
| ≈1% by weight of Part B | KELZAN ® (xanthan gum: Kelco Industrial Biopolymers) |

Mixing Instructions for the above-described Multi-part Formulation:

Disperse part "C" into part "B". While stirring part "A", add the "B/C" mix to part "A" and mix thoroughly. Avoid over-mixing to minimize air entrapment.

While particular formulations have been set forth to describe and exemplify this invention, such are not intended to be limiting. Rather, it should be noted by those ordinarily skilled in the art that the within disclosures are exemplary only and that various other alternative formulations may be made within the scope of the present invention. Accordingly, the present invention is not limited to the specific embodiments illustrated herein, but is limited only by the following claims.

We claim:

1. An anti-icing composition comprising an aqueous solution of monohydroxy and/or polyhydroxy alcohols thickened with a combination of an acrylic emulsion polymer and a water-swellable, colloid-forming clay mineral.

2. The composition of claim 1 further comprising at least 1 weight percent glycerine.

3. The composition of claim 1 for use in all types of locks.

4. The composition of claim 1, for use in or on moving mechanisms, further comprising Teflon powder as an added ingredient.

5. The composition of claim 1, for use in or on moving mechanisms, comprising graphite as an added ingredient.

6. The composition of claim 1, for use in windshield washer reservoirs of trucks or automobiles.

7. The composition of claim 6, comprising non-toxic freezing point depressants.

8. An anti-icing composition comprising an aqueous solution of fully hydrolyzed polyvinyl alcohol, with one polyol or a combination of polyols added to comprises at least 30 weight percent of the total composition.

9. The composition of claim 8 wherein said polyol or one of said combination of polyols comprises glycerine.

10. The composition of claim 8 wherein said aqueous solution of polyvinyl alcohol and said polyol or combination of polyols are mixed together within a few hours of application.

11. An anti-icing composition comprising an aqueous solution of polyvinyl alcohol, with one polyol or a combination of polyols added to comprise at least 30 weight percent of the total compsition, wherein said aqueous solution of polyvinyl alcohol and said polyol or combination of polyols are mixed together within a few hours of application, and wherein said aqueous solution of polyvinyl alcohol comprises the added ingredient of hydrogen peroxide, and said polyol or combination of polyols comprises the added ingredient of one or more polymeric thickening agents.

* * * * *